(12) United States Patent
Ellenberger

(10) Patent No.: US 9,856,882 B2
(45) Date of Patent: Jan. 2, 2018

(54) EXHAUST-GAS TURBOCHARGER

(71) Applicant: BorgWarner Inc., Auburn Hills, MI (US)

(72) Inventor: Dirk Ellenberger, Hochspeyer (DE)

(73) Assignee: BorgWarner Inc., Auburn Hills, MI (US)

( * ) Notice: Subject to any disclaimer, the term of this patent is extended or adjusted under 35 U.S.C. 154(b) by 380 days.

(21) Appl. No.: 14/397,783

(22) PCT Filed: Apr. 22, 2013

(86) PCT No.: PCT/US2013/037547
§ 371 (c)(1),
(2) Date: Oct. 29, 2014

(87) PCT Pub. No.: WO2013/165719
PCT Pub. Date: Nov. 7, 2013

(65) Prior Publication Data
US 2015/0132103 A1    May 14, 2015

(30) Foreign Application Priority Data

May 3, 2012  (DE) .................. 10 2012 008 910

(51) Int. Cl.
*F04D 27/00* (2006.01)
*F02B 37/12* (2006.01)
*F02B 37/16* (2006.01)
*F02B 37/18* (2006.01)
*F02B 39/00* (2006.01)
(Continued)

(52) U.S. Cl.
CPC ............ *F04D 27/002* (2013.01); *F02B 37/12* (2013.01); *F02B 37/16* (2013.01); *F02B 37/18* (2013.01); *F02B 37/186* (2013.01); *F02B 39/00* (2013.01); *F04D 19/00* (2013.01); *F04D 27/009* (2013.01); *F04D 29/668* (2013.01); *F16F 15/03* (2013.01); *Y02T 10/144* (2013.01)

(58) Field of Classification Search
CPC ........ F02C 6/12; F04D 27/002; F04D 29/668; F02B 37/12; F02B 37/186; F02B 27/00; F16F 15/03; F16F 2222/06; F16K 31/08; F16K 31/086
See application file for complete search history.

(56) References Cited

U.S. PATENT DOCUMENTS

| 4,339,780 A * | 7/1982 | Okubo | F16F 15/03 310/90.5 |
| 6,053,291 A * | 4/2000 | Shibahata | F16F 15/03 188/266.1 |

(Continued)

*Primary Examiner* — Woody Lee, Jr.
*Assistant Examiner* — Hoon Choi
(74) *Attorney, Agent, or Firm* — Eric L. Doyle; Stephan A. Pendorf; Patent Central LLC

(57) ABSTRACT

An exhaust-gas turbocharger (1) with a housing (2), a shaft (3) mounted in the housing (2), a compressor wheel (5) arranged on the shaft (3) and a turbine wheel (4) arranged on the shaft (3), a control element (7), an actuator (8), and a regulating rod (9) which connects the actuator (8) to the control element (7), including an electromagnetic damping arrangement (10) having a magnetic-field-generating element (14), and a first coil (15) with a closed electrical circuit (17), with either the magnetic-field-generating element (14) or the first coil (15) being fastened on the regulating rod (9).

10 Claims, 2 Drawing Sheets

(51) Int. Cl.
  *F16F 15/03*   (2006.01)
  *F04D 19/00*   (2006.01)
  *F04D 29/66*   (2006.01)

(56) References Cited

U.S. PATENT DOCUMENTS

| | | | | |
|---|---|---|---|---|
| 7,637,360 | B2 * | 12/2009 | Carlson | A47C 1/03 |
| | | | | 188/267.2 |
| 7,762,521 | B2 * | 7/2010 | Brun | F04B 7/0076 |
| | | | | 251/129.04 |
| 8,127,900 | B2 * | 3/2012 | Inoue | B60G 13/16 |
| | | | | 188/266.1 |
| 2007/0228627 | A1 * | 10/2007 | Kondou | B60G 13/00 |
| | | | | 267/195 |
| 2007/0271917 | A1 * | 11/2007 | Vogt | F02B 37/183 |
| | | | | 60/600 |
| 2008/0150458 | A1 * | 6/2008 | Ryynanen | F16F 15/03 |
| | | | | 318/362 |

* cited by examiner

EXHAUST-GAS TURBOCHARGER

BACKGROUND OF THE INVENTION

Field of the Invention

The invention relates to an exhaust-gas turbocharger.

Description of the Related Art

In exhaust-gas turbochargers, there are various control elements, such as for example wastegate flaps or the variable turbine geometry, that are actuated by means of an actuator and a regulating rod. The regulating rod and the mechanism of the control element can, virtually without damping, be incited to perform vibrations by external excitation. Even in the non-resonant case, said vibration can lead to increased wear of the moving parts. In particular if the actuator is in the form of a control capsule with an integrated spring, a spring-mass system is formed which can very easily be incited to perform vibrations by external excitation.

It is an object of the present invention to provide an exhaust-gas turbocharger which, while being inexpensive to produce, can be operated with little maintenance and with little wear.

BRIEF SUMMARY OF THE INVENTION

According to the invention, an electromagnetic damping arrangement is arranged on the regulating rod. The mode of operation of the damping arrangement is based on the application of Lenz's law. The damping arrangement is composed of a magnetic-field-generating element and a first coil. Either the magnetic-field-generating element or the first coil is fastened on the regulating rod. The respective other component is positionally fixed. The first coil comprises a closed electrical circuit, in particular with a resistance.

The magnetic-field-generating element is preferably in the form of an electrically energized coil. The magnetic-field-generating element may alternatively be in the form of a permanent magnet.

The damping is realized by the magnetic action, and there is no wear-afflicted mechanical contact between the damping arrangement and the regulating rod.

The magnetic-field-generating element generates a magnetic field in the axial direction of the regulating rod. The first coil moves in said magnetic field, such that a voltage is induced in the first coil. Said voltage in the first coil in turn generates a magnetic field which, in accordance with Lenz's law, opposes the original cause. That is to say, a magnetic field of opposite polarity is generated in the first coil, as a result of which the movement of the regulating rod is braked or dampened. The faster the movement of the regulating rod, the more intense the braking force. The intensity of the damping can preferably be regulated by means of the resistance in the electrical circuit of the first coil.

The damping proposed according to the invention is not subject to any wear, such that the damping action does not weaken over time, such as is the case for example with mechanical damping arrangements.

BRIEF DESCRIPTION OF THE SEVERAL VIEWS OF THE DRAWINGS

Further details, advantages and features of the present invention become apparent from the following description of exemplary embodiments with reference to the drawing, in which.

DETAILED DESCRIPTION OF THE INVENTION

An exemplary embodiment of the exhaust-gas turbocharger 1 will be described in detail below on the basis of FIGS. 1 and 2.

Figure 1:
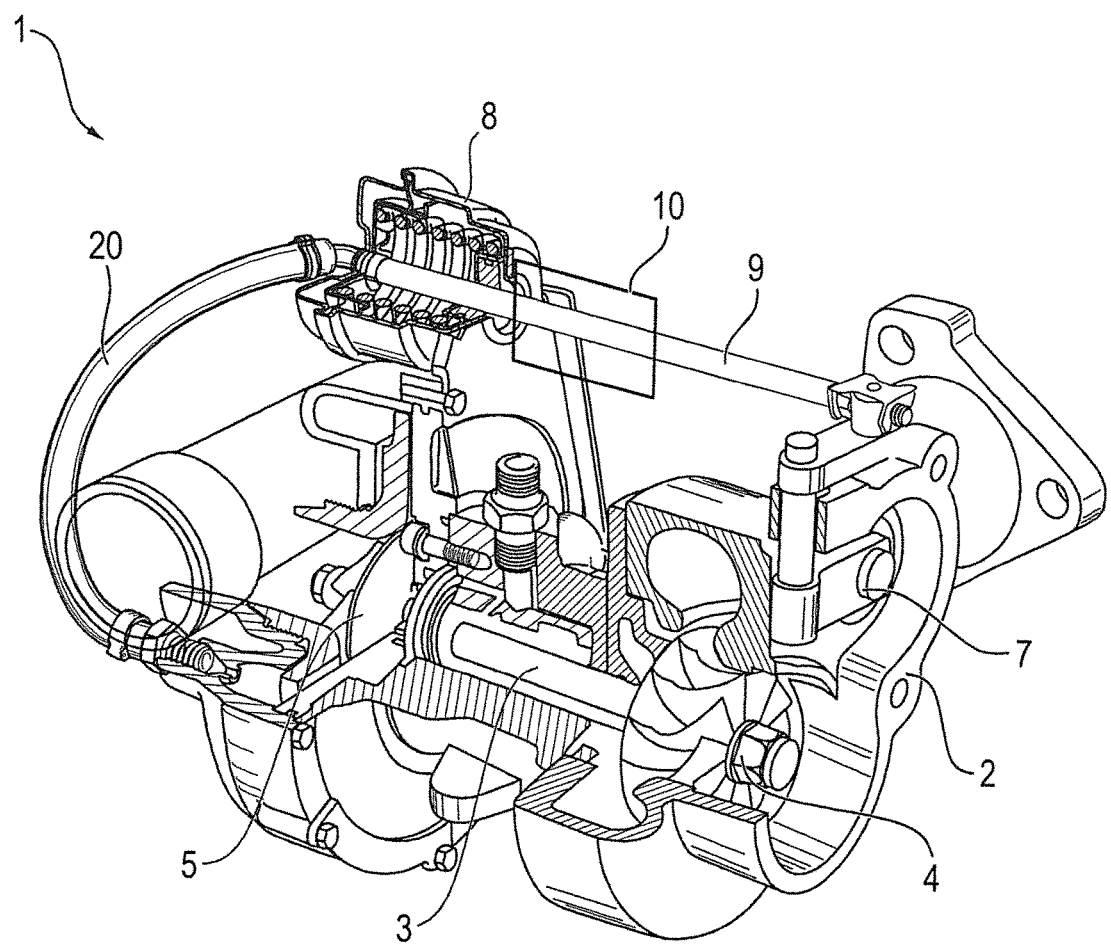
FIG. 1 shows an exhaust-gas turbocharger according to the invention as per an exemplary embodiment.

FIG. 1 shows the exhaust-gas turbocharger 1 in a partially cut-away view. The exhaust-gas turbocharger 1 comprises a housing 2 in which a shaft 3 is mounted. A turbine wheel 4 and a compressor wheel 5 are seated in a rotationally conjoint manner on the shaft 3. The turbine wheel 4 is impinged on by a flow of exhaust gas via an inflow duct. The turbine wheel 4 is thus set in rotation. Via the shaft 3, the compressor wheel 5 is also set in rotation, and thus compresses charge air for an internal combustion engine.

A wastegate duct leads directly, bypassing the turbine wheel 4, from the inflow duct 6 to an exhaust-gas outlet. The wastegate duct can be opened and closed by means of a wastegate flap. The wastegate flap is moved by means of a control element 7.

An actuator 8 in the form of a control capsule is also mounted on the housing 2. A pressure line 20 issues into said actuator 8. The actuator 8 is activated via said pressure line 20. The actuator 8 is connected to the control element 7 via a regulating rod 9. A movement generated in the actuator 8 is transmitted to the control element 7 via said regulating rod 9.

A damping arrangement 10 is provided for damping the movement of the regulating rod 9. FIG. 1 merely indicates the position of said damping arrangement 10.

Figure 2:
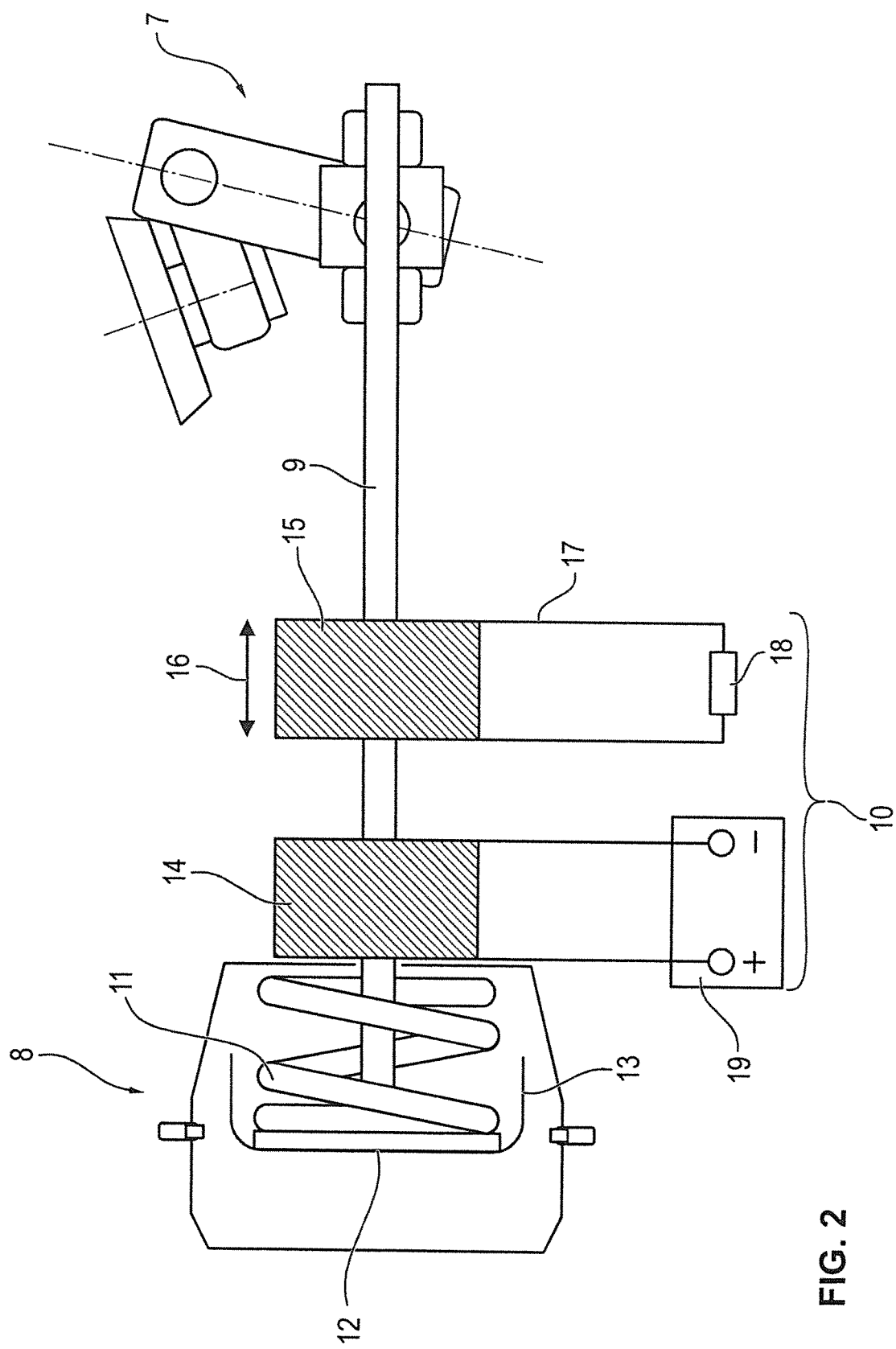
FIG. 2 shows a schematic detail view of the exhaust-gas turbocharger according to the invention as per the exemplary embodiment.

The exact design of the damping arrangement 10 is shown in FIG. 2. FIG. 2 shows the actuator 8, the regulating rod 9, the control element 7 and the damping arrangement 10 in a schematically simplified illustration.

The actuator 8, in the form of a control capsule, comprises a spring 11 which is connected to the regulating rod 9. The spring 11 is supported with one end against the regulating rod 9 and with the other end against a housing of the actuator 8. The spring 11 and the regulating rod 9 are moved by means of a diaphragm 12 and a diaphragm plate 13.

The damping arrangement 10 comprises a first coil 15 and a magnetic-field-generating element 14. The magnetic-field-generating element 14 is in the form of a second coil. The first coil 15 comprises a closed electrical circuit 17 in which a resistance 18 is arranged. The magnetic-field-generating element 14 in the form of a second coil is electrically energized by means of a voltage supply 19.

The regulating rod 9 extends through the first coil 15 and through the magnetic-field-generating element 14 in the form of a second coil.

The first coil 15 is fixedly connected to the regulating rod 9 such that the first coil 15 performs the same movement 16 as the regulating rod 9.

The magnetic-field-generating element 14 is arranged positionally fixedly relative to the housing 2. In the exemplary embodiment shown, the magnetic-field-generating element 14 is mounted directly on the actuator 8.

The magnetic-field-generating element 14 generates a first magnetic field. As a result of a movement of the regulating rod 9, the first coil 15 moves in said first magnetic field. A voltage is induced in the first coil 15 as a result. Said voltage in turn generates a further magnetic field in the coil 15. Said further magnetic field opposes the original cause thereof, such that damping of the movement of the regulating rod 9 is generated.

As an alternative to the illustrated exemplary embodiment, it is possible for the magnetic-field-generating element 14 to be in the form of a permanent magnet. Furthermore, it is also possible for the magnetic-field-generating element 14 to be mounted fixedly on the regulating rod 9 and to thus perform the movement 16. In this case, the first coil 15 is then mounted positionally fixedly relative to the housing 2.

In addition to the above written description of the invention, reference is hereby explicitly made to the diagrammatic illustration of the invention in FIGS. 1 and 2 for additional disclosure thereof.

LIST OF REFERENCE SIGNS

1 Exhaust-gas turbocharger
2 Housing
3 Shaft
4 Turbine wheel
5 Compressor wheel
6 Inflow duct
7 Control element
8 Actuator
9 Regulating rod
10 Damping arrangement
11 Spring
12 Diaphragm
13 Diaphragm plate
14 Magnetic-field-generating element, formed as second coil
15 First coil
16 Movement
17 Electrical circuit
18 Resistance
19 Voltage supply
20 Pressure line

The invention claimed is:

1. An exhaust-gas turbocharger (1) comprising
a housing (2),
a shaft (3) mounted in the housing (2),
a compressor wheel (5) arranged on the shaft (3) and a turbine wheel (4) arranged on the shaft (3),
a control element (7) selected from a wastegate flap and a variable turbine geometry,
an actuator (8), and
a regulating rod (9) which connects the actuator (8) to the control element (7), further comprising a vibration damping arrangement (10) having:
a magnetic-field-generating element (14), and
a first coil (15) with a closed electrical circuit (17),
with either the magnetic-field-generating element (14) or the first coil (15) being fastened on the regulating rod (9),
wherein the magnetic-field-generating element (14) generates a first magnetic field in the axial direction of the regulating rod (9),
wherein when the first coil (15) is moved in said magnetic field a voltage is induced in the first coil (15), said voltage in the first coil in turn generating, in accordance with Lenz's law, a magnetic field of opposite polarity in the first coil (15),
whereby opposing magnetic fields effect a vibration damping of the regulating rod (9).

2. The exhaust-gas turbocharger as claimed in claim 1, wherein the magnetic-field-generating element (14) is in the form of a permanent magnet.

3. The exhaust-gas turbocharger as claimed in claim 1, wherein a resistance or resistor (18) is arranged in the closed electrical circuit (17) of the first coil (15).

4. The exhaust-gas turbocharger as claimed in claim 1, wherein the first coil (15) and/or the magnetic-field-generating element (14) are arranged in encircling fashion around the regulating rod (9).

5. The exhaust-gas turbocharger as claimed in claim 1, wherein the magnetic-field-generating element (14) is fastened on the regulating rod (9) and the first coil (15) is arranged positionally fixedly with respect to the housing (2), or wherein the first coil (15) is fastened on the regulating rod (9) and the magnetic-field-generating element (14) is arranged positionally fixedly with respect to the housing (2).

6. The exhaust-gas turbocharger as claimed in claim 1, wherein the actuator (8) is in the form of a pressure-controlled control capsule.

7. The exhaust-gas turbocharger as claimed in claim 1, wherein the control element (7) is designed for adjusting a wastegate flap or a variable turbine geometry.

8. The exhaust-gas turbocharger as claimed in claim 1, wherein a regulable resistance or resistor (18) is arranged in the electrical circuit (17) of the first coil (15).

9. The exhaust-gas turbocharger as claimed in claim 1, wherein the magnetic-field-generating element (14) is fastened on the regulating rod (9) and the first coil (15) is arranged positionally fixedly with respect to the housing (2), on the actuator (8), or wherein the first coil (15) is fastened on the regulating rod (9) and the magnetic-field-generating element (14) is arranged positionally fixedly with respect to the housing (2), on the actuator (8).

10. An exhaust-gas turbocharger (1) comprising
a housing (2),
a shaft (3) mounted in the housing (2),
a compressor wheel (5) arranged on the shaft (3) and a turbine wheel (4) arranged on the shaft (3),
a control element (7),
an actuator (8), and
a regulating rod (9) which connects the actuator (8) to the control element (7), further comprising a damping arrangement (10) having
a first coil (15) with a closed electrical circuit (17), and
a magnetic-field-generating element (14) in the form of an electrically energized second coil
with either the magnetic-field-generating element (14) or the first coil (15) being fastened on the regulating rod (9).

* * * * *